July 10, 1923.
H. V. WHEELER
FLOUR SIFTER
Filed Oct. 5, 1921 2 Sheets-Sheet 1
1,461,567
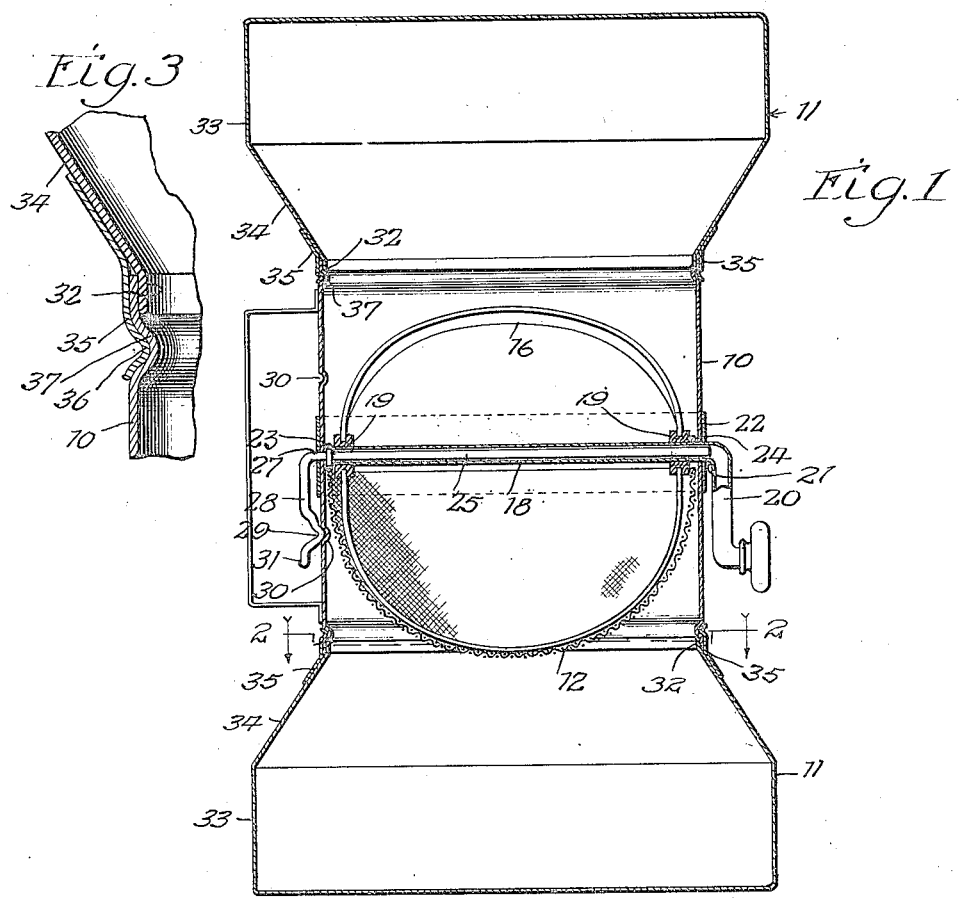
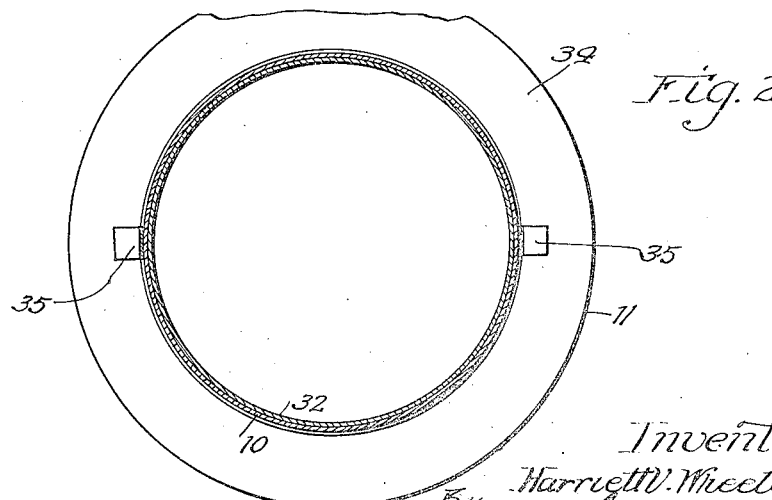

July 10, 1923.  1,461,567

H. V. WHEELER

FLOUR SIFTER

Filed Oct. 5, 1921  2 Sheets-Sheet 2

Inventor
Harriett V. Wheeler

Patented July 10, 1923.

1,461,567

UNITED STATES PATENT OFFICE.

HARRIETT V. WHEELER, OF CHICAGO, ILLINOIS.

FLOUR SIFTER.

Application filed October 5, 1921. Serial No. 505,486.

*To all whom it may concern:*

Be it known that I, HARRIETT V. WHEELER, a citizen of the United States, and a resident of Chicago, in the county of Cook and State of Illinois, have invented certain new and useful Improvements in Flour Sifters; and I do hereby declare that the following is a full, clear, and exact description thereof, reference being had to the accompanying drawings, and to the characters of reference marked thereon, which form a part of this specification.

This invention relates to a novel kitchen utensil in the nature of a flour sifter, and refers more specifically to a utensil of this general character which is designed not only for sifting flour and like materials but also for mixing with flour other pulverulent materials, such as soda, baking powder, salt, and the like in preparing the flour for special baking uses.

An object of the invention is to produce in a utensil of this character a reversible sieve having novel means to support the sieve to enable it to be turned or reversed in the container relatively to the agitating device by which the material is forced through the sieve, and to novel means of supporting the agitating device, the sieve being adapted to cooperate with the agitator device in both positions of adjustment of the sieve, so that by reversing the position of the container the material may be alternately sifted through the sieve in opposite directions and to fall therefrom alternately into the opposite ends of the container, and the whole being arranged to be compact and rugged and constructed to maintain the bearings for the sieve and agitator properly aligned.

Another object of the invention is to produce a novel means of mounting the sieve in the container, constructed to permit reversal of the sieve by a suitable exteriorly exposed actuating device, and for locking the sieve in its different positions of adjustment.

A further object of the invention is to produce a novel utensil of this character having one or more removable measuring cups which constitute the end or ends of the container and so located that the material drops thereinto from the sieve, said cup or cups constituting means for receiving the sifted material and, when detached, means for carrying the material from the utensil.

Another object of the invention is to provide a novel means of constructing and assembling the sifter elements, including a sieve and a rotative agitator device, arranged to permit ready assembling of the elements and to permit the screen member to be reversed relatively to the agitator device.

Other objects of the invention are to improve and simplify utensils of this character, and the invention consists in the combination and arrangement of the parts shown in the drawings and described in the specification, and is pointed out in the appended claims.

In the drawings:

Figure 1 is an axial section of a utensil embodying my invention.

Figure 2 is a cross section on the line 2—2 of Figure 1.

Figure 3 is an enlarged detail, illustrating the manner of removably fixing the cup or cups to the body of the container which contains the sifting and mixing elements.

Figure 4:
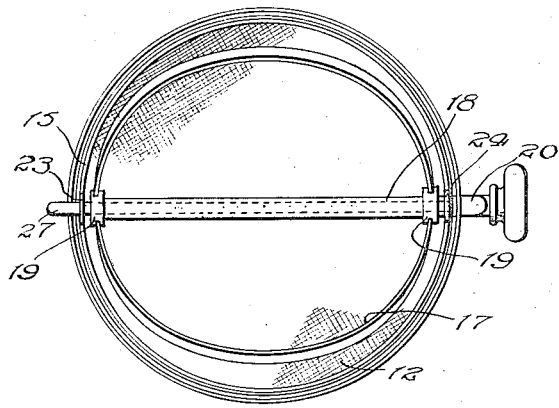
Figure 4 is a plan view of the sifting and mixing elements, removed from the container.
Figure 5:
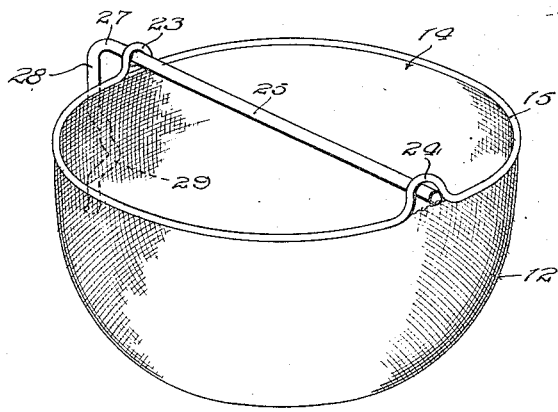
Figure 5 is a perspective view of the sieve.
Figure 6:
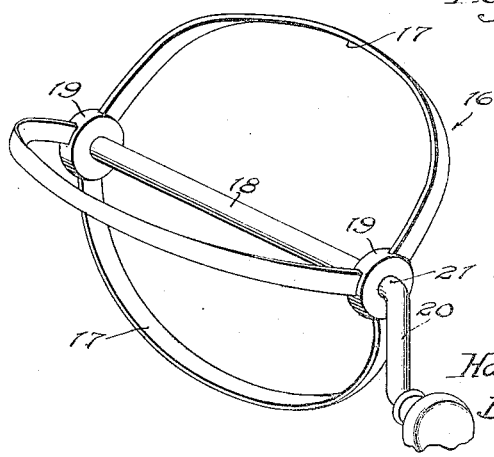
Figure 6 is a perspective view of the agitator device which cooperates with the sieve.

As shown in the drawings, 10 designates the intermediate main body of the container. It may be made of sheet metal and of any desired cross section, being cylindric, as herein shown. It is open at both its ends. 11, 11 designate removable end measuring and closure cups to fit over and close the open ends of the container. Said cups 11 are open at their inner ends and are adapted to be detachably fixed to the ends of the container in a manner presently to be described. Said cups are otherwise closed and constitute receptacles to receive the material which is passed through the sieve and also constitute, when detached from the container 10, means to remove the material from the utensil. As shown, both ends of the container are removable to constitute the cups 11, so that the sifted or mixed material may be removed from the utensil by detaching either of the cups in which the material is then contained. It is practical, however, though not so convenient, to construct and use the utensil with but a single detachable end piece or measuring cup.

Within the intermediate body 10 of the container is supported a sieve 12. In the illustrated embodiment of the invention, said sieve is semi-spherical, it being a basket-like structure which is fully open throughout its diameter at one side. The sieve is made of wire netting of the desired mesh and is reinforced at its edges around its opening 14 by a binding wire or band 15, the latter defining the opening 14 to receive the agitator device, hereinafter described.

16 designates as a whole the agitator device. It comprises a plurality of curved arms 17 angularly spaced about the axis of a supporting and operating shaft 18. For the purpose of the present embodiment of the invention, said shaft is tubular. As shown, three of such agitator arms or members are used, but a greater or less number can be employed. They are preferably made of sheet metal, and the longitudinal curvature of said members is such as to cause them to conform closely to the contour of the inner surface of the sieve, closely against which they lie and are adapted to be moved. Preferably the said agitator arms are transversely rounded on their outer sides to move smoothly across the sieve.

The agitator arm assembly may be made of any suitable construction. As herein shown the tubular shaft 18 is provided with hubs or discs 19 that are radially notched to receive the ends of the agitator arms. Said arms are made of a resilient material, whereby the interlocking connections of their ends with the notched discs 19 aid to retain the arms properly in place and properly curved. If desired, drops of solder may be applied to said arms and the notched portions of the discs to further aid in holding the assembly together. One end of the shaft is extended beyond the adjacent disc 19 and is formed to provide a hand crank 20 by which the agitator is rotated. That portion of the said shaft 18 adjacent to the crank constitutes a bearing member 21 which is rotatively mounted in a suitable bearing in the wall of the container 10. The container 10 is shown as surrounded by a hoop 22 to reinforce the central portion thereof, and to also give added bearing surface in the container wall for the shaft 18.

The sieve 12 is supported at one side on the tubular shaft 18 and at its other side on a rocking rod or shaft 25 which lies principally within and is supported by the tubular shaft 18 and constitutes means to turn or reverse the sieve, as will hereinafter more fully appear. The specific means for so supporting the sieve in the illustrated embodiment of the invention is made as follows:

The binding ring 15 of the basket-like sieve is provided at diametric points with upstanding loops 23, 24. The supporting and operating shaft 18 for the agitator device extends loosely through the loop 24, said loop being between the agitator device and the adjacent wall of the container. The solid shaft or rod 25 embraces a straight portion which lies axially in the tubular shaft 18 and may extend into the bearing portion 21 of said latter shaft. Said sieve turning or reversing shaft 25 is of a diameter to fit with a somewhat loose bearing in the tubular shaft 18.

The end of the sieve reversing shaft 25 remote from the crank 20 of the agitator shaft 18 is provided with an axial extension 27 which projects through an opening in the wall of the container and the reinforcing hoop 22 and has rocking bearing therein. Said shaft 25 also extends through the sieve binding wire loop 23 and is fixed in any suitable manner to said loop 23, as by being soldered thereto, so that turning movement of said shaft imparts a rocking or reversing movement to the sieve. It will thus be observed that the basket-like sieve is suspended partly on the tubular shaft 18 and partly on the solid shaft 25 through the medium of the loops 24, 23, respectively, and through said shafts is suspended on the container wall. This construction permits ready assembly of the parts and permits the sieve to be readily reversed relatively to and around the axes of said shafts.

The extension 27 of the sieve reversing shaft 25 is turned radial to the shaft 25 to produce a handle and latch 28, and said latch is formed with a short curve 29 to provide a locking projection adapted to severally engage with exterior locking recesses 30, 30 on the adjacent wall of the container; said recesses being located at equal distances from the axis of said sieve turning or reversing shaft 25. Beyond the locking projection 29 the latch turns outwardly at 31 to enable the latch to be pulled outwardly away from the locking recesses 30 into which the locking projection 29 of the latch 28 is normally engaged by the resiliency of the latch.

The construction described provides diametrically opposed bearings for the tubular shaft 18 of the agitator, one of said bearings being formed in the band reinforced part of the container wall and the other being formed on the sieve turning shaft adjacent to the latch 28. Thereby the agitator arms may be rotated relatively to the normally fixed sieve, held in place by the latch device described. Thus the agitator arms are free to rotate while the sieve, suspended from the shafts 18 and 25, is held fixed relatively to the container. When it is desired to turn the container from the position shown in Figure 1, the latch 28 is released from the locking recess 30, whereupon, by turning the shaft 25 through the agency of said latch, said sieve is rotated in a half circle to bring it to the opposite side of the shaft. The container will now be bodily endwise reversed, so as to bring the sieve again below its reversing shaft.

The cups 11 may be of any suitable form and dimensions to provide the necessary capacity for the sifter and mixing utensil. As herein shown, each cup comprises an inner cylindric portion 32, an outer, larger cylindric portion 33, and an intermediate, tapered or conical portion 34. The inner cylindric portion 32 of each cup telescopically fits inside the cylindric end of container 10, as best shown in Figure 3, and the parts may be connected together by two or more spring latches 35 which may be soldered or otherwise attached to the cups beyond the ends of the container. Said latches are provided at their inner ends with curved locking portions 36, each adapted to engage with a locking groove or recess 37 formed on the outer side of the adjacent container end. When the cup locking devices herein shown are employed it is an advantage to make the matching parts of the cups and the container body cylindrical, inasmuch as the locking latches may be made to engage with a continuous groove formed by beading the container, notwithstanding the angular relation of the latches to the axis of the container 10 when the cups are presented thereto. If the said container and matching portions of the cups be of other cross section, other forms of locking devices may be employed; or, in either event, a tapered matching fit may fulfil the requirements.

In the operation of the device, one of the cups 11 is removed and the material to be sifted or sifted and mixed is poured into the basket-like sieve. In the position shown in Figure 1, where the basket-like screen is below the shafts 25 and 18, the upper cup will be removed for this purpose. Thereafter said cup is fittted and locked in place on the upper end of the container and the agitator device is rotated through the medium of the crank 20 until all of the material has been forced through the sieve into the lower cup 11. Thereafter the basket-like sieve is reversed, first, by releasing the projection of the latch 28 from the locking recess 30 and then turning or rocking the shaft 25 to reverse the sieve to a position above the shafts 25 and 28 and thereafter locking the latch to the upper recess or notch 30. Thereupon the entire container is endwise reversed and, through the action of the rotating agitator, the material is again forced through the sieve into the lower cup. These operations will be repeated until the material has been sufficiently sifted or mixed. After the last operation, the material is in the lowermost cup and can be removed from the utensil by detaching the cup from the container; the cup serving as a receptacle to carry the material to a desired place for use. If but one of the cups is thus made detachable it is only necessary to reverse the utensil and sieve so that the last sifting will fall into the detachable lower cup.

From what has been said, it will be observed that after the material, whether it be lumpy flour or other material to be reduced to a given mesh, or whether it be a mixture of flour or the like, and other materials, such as baking powder, soda, salt, and the like, to be mixed, the said material may be sifted as many times as desired within a completely closed container by reversing the sifter and the container between sifting operations. Therefore, the sifting operations can be carried on without loss of the material, such as would occur if the material were sifted into an open receptacle, and thereafter recharged into the sifter for resifting. Furthermore, the sifting operation can be carried on in a sanitary manner inasmuch as no dirt or foreign substance can come into contact with the material while being sifted. Moreover, the sifting operation can be carried on in the open air or at any place where air is moving at a velocity in which it would be otherwise impracticable to sift the material in an open sifter.

The joint formed between the cylindric inner ends 32 of the cup and the cylindric ends of the body 10, embracing the fitting of the part 32 within the body, is an advantageous one, especially when employed in connection with the inwardly formed recesses or beads to receive the ends of the latches, inasmuch as this construction forms a relatively non-projecting internal surface at the connection of the cups to the sifter body or container and also provides a close joint against the leakage of flour between the overlapping parts. The terminals of the parts 32 fit against the convex inner parts of the beads that thus produce the locking recesses, and further insure a powder proof joint. Moreover, the ends of the latches are located and formed for ready external access, so that they can be sprung away from the locking recesses by engagement of the terminals thereof by the thumb or fingers.

It will be understood that the structural details of the illustrated embodiment of the invention can be varied within the scope of the appended claims, and that the invention is not intended to be limited to said details, except as specifically claimed and as imposed by the prior art.

I claim as my invention:

1. A sifter utensil comprising a container open at its end and adapted to be endwise reversed, a reversible sifter and a rotary beater therein, a measuring cup and closure fitted over the open end of said container, said measuring cup and closure embracing a closed end portion of greater diameter than the container and a tapered portion which telescopes in the open end of the container, and a handle for the container postioned within the circumferential outline of the larger diameter of the measuring cup.

2. A sifter utensil comprising a closed, endwise reversible container having at one end a removable measuring cup and closure, a basket-like sieve mounted within the container for reversal, and an agitator rotative within the sieve, embracing a tubular shaft, a screen reversing shaft fixed to the sieve and extending into and through the tubular agitator shaft, both said shafts extending diametrically through the container and mounted in the container wall and each provided exterior to said wall with operating means.

3. A sifter utensil comprising a closed, endwise reversible container having at one end a removable closure, a basket-like sieve mounted within the container for reversal, and an agitator rotative within the sieve, embracing a tubular shaft, a screen reversing shaft fixed to the sieve and extending into and through the tubular agitator shaft, said shafts extending diametrically through the container and mounted in the container wall and provided exterior to said wall with operating means, and the said sieve being reversible about the axis of the assembled shafts.

4. A sifter utensil comprising a closed endwise reversible container having at one end a removable closure, an agitator within the container embracing a tubular shaft which extends at one end through the container wall and has rotative bearing therein, with means to rotate the shaft, the other end of said shaft terminating closely adjacent, but short of, the container wall, a second shaft extending into said tubular shaft and projecting at one end through the container wall and provided with an adjusting arm and a semi-spherical, reversible sieve having means at diametrically opposite points to mount it on said first and second shafts and fixed to said second shaft to constitute said latter shaft as means to reverse said sieve.

5. A sifter utensil comprising a closed endwise reversible container having at one end a removable closure, an agitator with the container embracing a tubular shaft which extends at one end through the container wall and has rotative bearing therein, with means to rotate the shaft, the other end of said shaft terminating closely adjacent, but short of, the container wall, a second shaft extending into said tubular shaft and projecting at one end through the container wall and provided with an adjusting arm and a semi-spherical, reversible sieve provided at diametrically opposite points of its open end with loops adapted, one to be suspended from said tubular shaft and the other to be suspended from the inner shaft and attached to the latter.

6. A sifter utensil comprising a container open at its end and adapted to be endwise reversed, a reversible sifter and a rotary beater therein, and a measuring cup and closure fitted over the open end of said container, said measuring cup and closure embracing a closed end portion an operating handle secured to said beater and located within the confines of said greater diameter, of greater diameter than the container and a smaller tapered portion, and means to join the tapered portion of the cup to the open container end embracing an annular external groove formed in the metal wall of the open end of the container, and a latch fixed to said cup and formed with a complemental curved portion to enter said groove.

7. A sifter utensil comprising a container open at its end and adapted to be endwise reversed, a reversible sifter and a rotary beater therein, and a measuring cup and closure fitted over the open end of said container, said measuring cup and closure embracing a closed end portion an operating handle secured to said beater and located within the confines of said greater diameter, of greater diameter than the container and a smaller tapered portion, and means to join the tapered portion of the cup to the open container end embracing an annular external groove formed in the metal wall of the open end of the container, and a latch fixed to said cup and formed with a complemental curved portion to enter said groove, the inner open end of said cup telescoping within said open end of the container with the innermost edge engaged with the internal bead formed by producing the locking groove in the container wall.

In witness whereof I claim the foregoing as my invention, I hereunto append my signature this 1 day of October, 1921.

HARRIETT V. WHEELER.

Certificate of Correction.

It is hereby certified that in Letters Patent No. 1,461,567, granted July 10, 1923, upon the application of Harriett V. Wheeler, of Chicago, Illinois, for an improvement in "Flour Sifters," an error appears in the printed specification requiring correction as follows: Page 4, strike out lines 71 to 110, comprising present claims 6 and 7, and insert the following as claims 6 and 7:

6. A sifter utensil comprising a container open at its end and adapted to be endwise reversed, a reversible sifter and a rotary beater therein, and a measuring cup and closure fitted over the open end of said container, said measuring cup and closure embracing a closed end portion of greater diameter than the container and a smaller tapered portion, an operating handle secured to said beater and located within the confines of said greater diameter, and means to join the tapered portion of the cup to the open container end embracing an annular external groove formed in the metal wall of the open end of the container, and a latch fixed to said cup and formed with a complemental curved portion to enter said groove.

7. A sifter utensil comprising a container open at its end and adapted to be endwise reversed, a reversible sifter and a rotary beater therein, and a measuring cup and closure fitted over the open end of said container, said measuring cup and closure embracing a closed end portion of greater diameter than the container and a smaller tapered portion, an operating handle secured to said beater and located within the confines of said greater diameter, and means to join the tapered portion of the cup to the open container end embracing an annular external groove formed in the metal wall of the open end of the container, and a latch fixed to said cup and formed with a complemental curved portion to enter said groove, the inner open end of said cup telescoping within said open end of the container with the innermost edge engaged with the internal bead formed by producing the locking groove in the container wall.;

and that the said Letters Patent should be read with this correction therein that the same may conform to the record of the case in the Patent Office.

Signed and sealed this 16th day of October, A. D., 1923.

[SEAL.]

WM. A. KINNAN,
*Acting Commissioner of Patents.*